United States Patent
Salerni

[11] 3,809,266
[45] May 7, 1974

[54] CARGO LOADING AND CARRYING DEVICE

[76] Inventor: Paul L. Salerni, c/o Dr. M. E. McCormick, U.S. Naval Academy, Annapolis, Md. 21402

[22] Filed: July 25, 1972

[21] Appl. No.: 274,906

[52] U.S. Cl.............. 214/450, 214/83.24, 214/85.1
[51] Int. Cl. .............................................. B60r 9/00
[58] Field of Search..................... 214/450, 85, 85.1; 224/42.1 H

[56] References Cited
UNITED STATES PATENTS 3,480,166   11/1969   Abbott............................... 214/450
3,452,893   7/1969    Heflin................................. 214/450
2,849,135   8/1958    Embler............................... 214/450

FOREIGN PATENTS OR APPLICATIONS 14,374   5/1969   Australia............................. 214/450

Primary Examiner—Gerald M. Forlenza
Assistant Examiner—John Mannix

[57]  ABSTRACT

A load carrying device for a vehicle top mounting having a folding track and a load carrying dolly riding on the track. The track is long enough to reach from the vehicle top to the point of delivery or pick-up of the load. A winch is provided to raise or lower the load.

2 Claims, 4 Drawing Figures

PATENTED MAY 7 1974  3,809,266

PATENTED MAY 7 1974

CARGO LOADING AND CARRYING DEVICE

The invention described herein may be manufactured and used by or for the Government of the United States of America for Governmental purposes without the payment of any royalties thereon or therefor.

BACKGROUND OF THE INVENTION

The invention is in an area in which there has been considerable interest and development. Car top carriers are well known in the art and the problem of raising the load has been recognized.

SUMMARY OF THE INVENTION

The present invention provides a vehicle top mounted load carrier which has a movable carriage and a collapsable ramp to facilitate loading and unloading the carrier. The folding ramp has a removable section usable to prevent the inversion of the load carriage when loading or unloading.

DESCRIPTION OF THE PREFERRED EMBODIMENT

Figure 1:
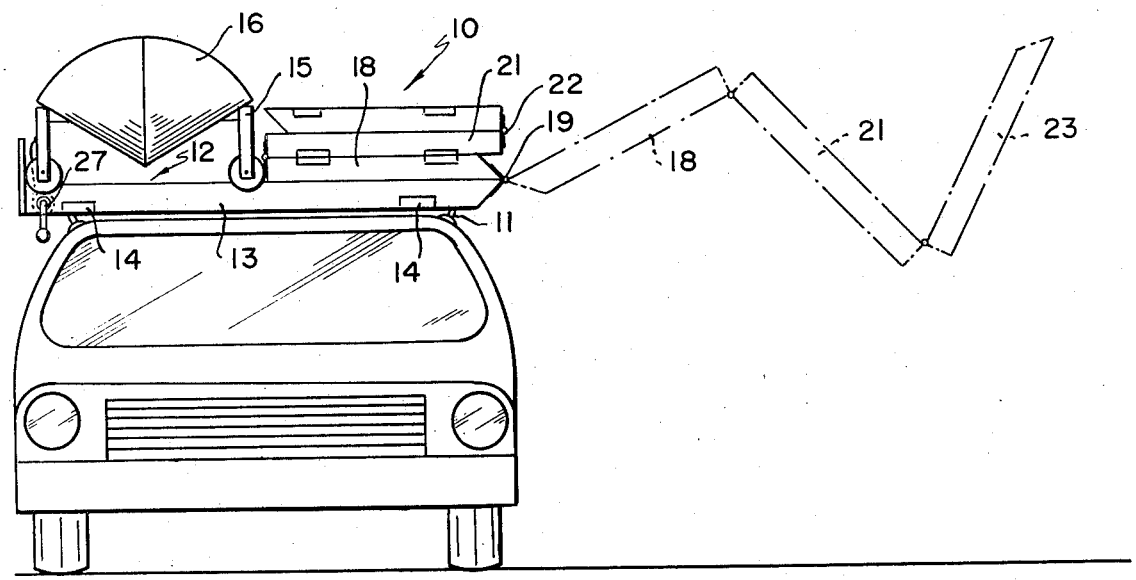
FIG. 1 is a schematic drawing showing the carrier mounted on a vehicle in carrying position with an intermediate position of the folding ramp shown in broken lines.
Figure 2:
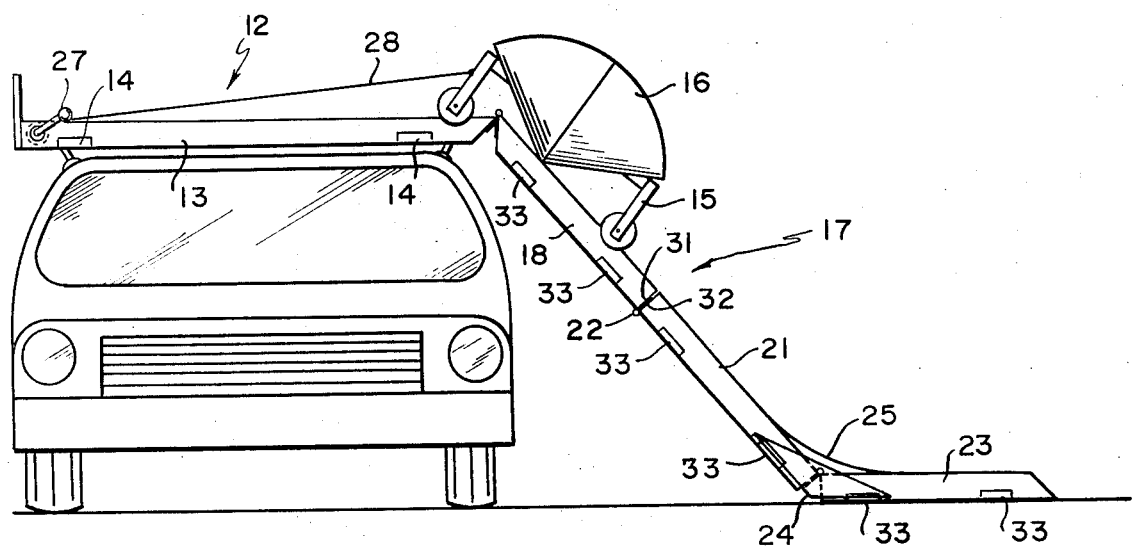
FIG. 2 is a schematic drawing showing the carrier mounted on a vehicle with the ramp extended and with the added element for preventing the inversion of the carriage in place.
Figures 3, 4:
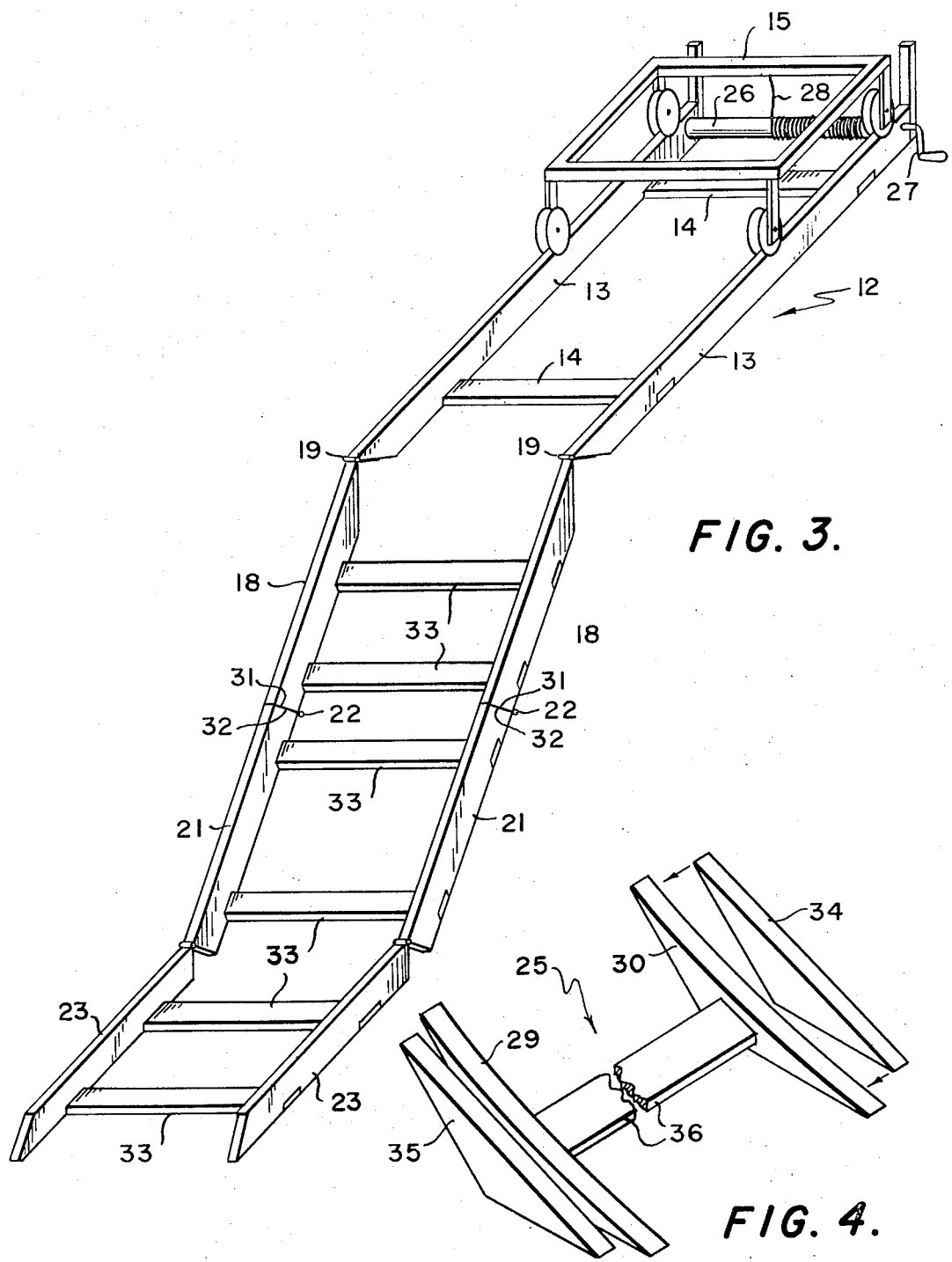
FIG. 3 is a schematic perspective of the carrier mounted without the vehicle.
FIG. 4 is a perspective view of the element to prevent inversion of the carriage.

Referring now to FIG. 1 there is shown a carrier 10 mounted on a vehicle top by any suitable means 11, such as suction cups. The carrier comprises a rectangular frame 12 having a track member 13 and cross members 14 shown in FIG. 3, with the member 13 forming a track on which carriage 15 moves. The track may be designed for either sliding or rolling engagement with the carriage 15. As shown, a load such as a canoe 16 is supported and secured to the carriage 15 by any suitable means, such as straps, clamps, etc. (not shown).

Attached to the frame 12 is a ramp 17 having a plurality of sections, the first section 18 of the ramp being hinged to the frame at 19. The second section 21 is hinged by hinge 22 to section 18 such that is foldable back onto the section 18 when folded. A third section 23 is hinged by hinge 24 on the opposite side of the second section from the hinge 22 between the first and second sections. It should be understood, however, that more than three sections can be employed. That portion of the ramp between the vehicle top and the point of loading or discharge of the load is so designed to provide a self-supporting track for the carriage.

A removable section 25 having a curved surface which tapers into the surface of the ramp to form a continuation of the track for the carriage is provided. The curved section is adapted to fit between the last and the penultimate sections of the ramp. The removable section 25 comprises two end pieces 29 and 30 and a cross piece 36. To pieces 29 and 30 are attached respectively plate pieces 35 and 34, which serve to position the pieces 29 and 30 on the ramp when the ramp is extended. For storage the section 25 may be secured to the top of the stacked ramp on top of the vehicle.

The carriage 15 is shown as a four-wheeled rectangular frame to which the load is attached. Suitable means are provided to secure the carriage in transport position. Mounted in the frame 12 is a winch system 26 having crank at least one lever 27 and a cable 28 connected to the carriage 15 for raising and lowering the carriage on the ramp. Suitable locking or ratchet means (not shown) may be provided to operate with the winch for securing the winch in selected positions to control the position and movement of the carriage.

OPERATION OF THE SYSTEM

In operation, the carrier may be removably or fixedly secured to the vehicle top. For loading the ramp 12 is extended to the surface from which the load is to be raised—as shown the load is a canoe. If the load is resting with the desired side uppermost, the ramp and the carriage are both lowered and the load is positioned on and secured to the carriage, then the carriage with the load attached is winched up to the vehicle top. The ramp is then refolded and secured and the carrier and load are ready for transporting.

To unload the carrier, the ramp is lowered and, if it is desired to retain the same side of the load uppermost, the removable section 25 is placed in position as shown in FIG. 1, and the carriage is lowered by the winch 26. The section 25 causes the wheels of the carriage 15 to ride over the hinge joint at 24 and retain the load in its upright position when it reaches the point of unloading. If it is desired to invert the load at the point of unloading, the removable section is left out and the carriage when lowered is stopped at the point 24 due to the sharpness of the angle and the load then tends to tip over so that the load can be readily inverted and the carriage removed.

The ramp is made self-supporting by positioning the hinges so that the adjacent faces of the ramp members abut when the ramp is extended. Thereby the hinge joints, such as 22, intermediate the attachment to the frame 12 and the hinge 24 are placed under tension while the abutting faces, as at 31 and 32, are put under compression by the weight of the load. These abutting faces are generally cut at right angles to the length of the ramp and have sufficient width to provide structural strength to the ramp. The ramp is internally braced by cross pieces 33.

Obviously, many modifications and variations of the present invention are possible in the light of the above teachings. It is therefore to be understood that within the scope of the appended claims the invention may be practiced otherwise than as specifically described.

What is claimed is:

1. A load carrier for mounting atop a vehicle comprising:
   a frame member;
   means releasably connecting said frame member to a vehicle top;
   said frame member being rectangular and having two sides of said rectangle extending above the other two sides to thereby form a track member;
   a load carrying carriage movable on said track;
   a foldable ramp member attached to said frame to form a continuation of said track;
   winch means mounted in said frame;

cable means interconnecting said carriage and said winch; and a removable section for said ramp to selectively control the inversion of the load when unloading, the removable section comprises a cross-piece; first and second end pieces mounted in spaced relationship on said cross-piece; each of said end pieces having a concave track surface which, when said removable section is positioned on said ramp, contacts the track surface of the ramp at both ends of the concave surface substantially tangentially.

2. A device as claimed in claim 1 wherein a plate member is attached to each of said end pieces to position the end pieces relative to the track of said ramp when said removable section is in position.

* * * * *